Aug. 15, 1961 R. P. ROHDE ET AL 2,996,048
ADJUSTABLE VALVE
Filed Sept. 8, 1959 3 Sheets-Sheet 1
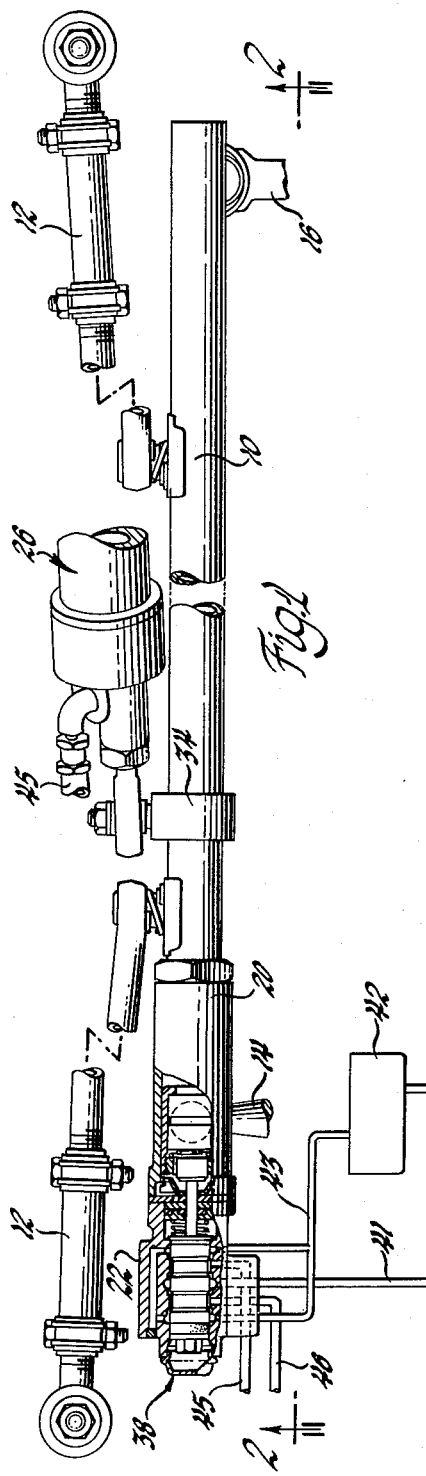
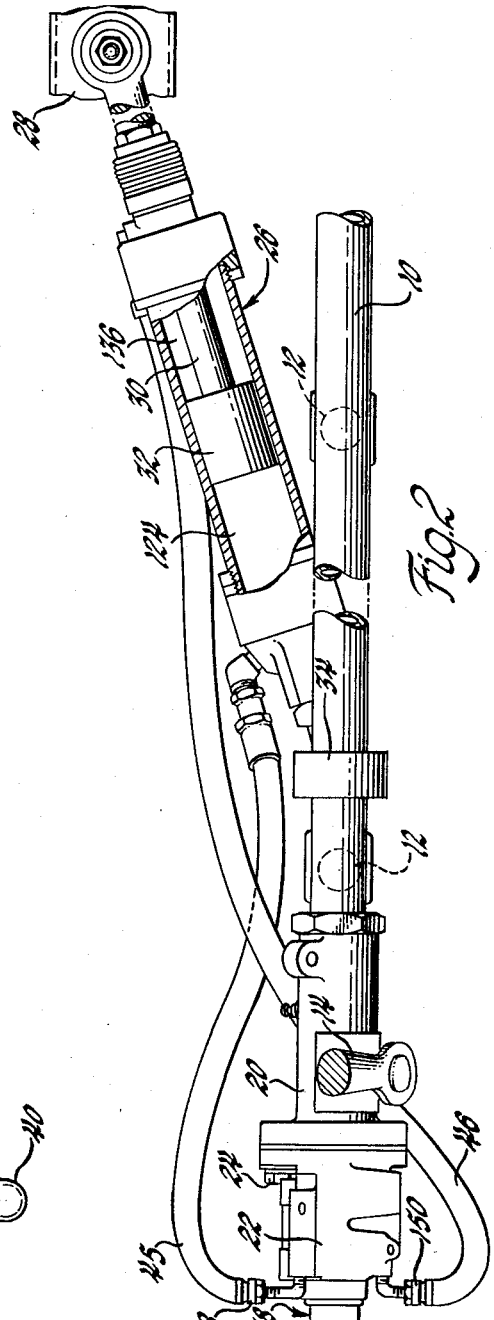
INVENTORS
Robert P. Rohde &
BY William B. Thompson
Bryce Beecher
ATTORNEY

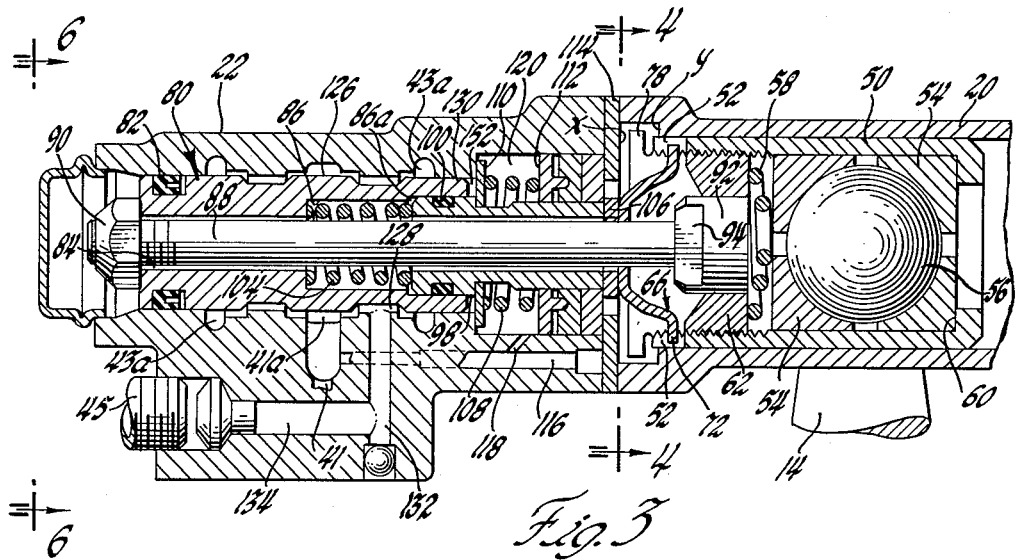
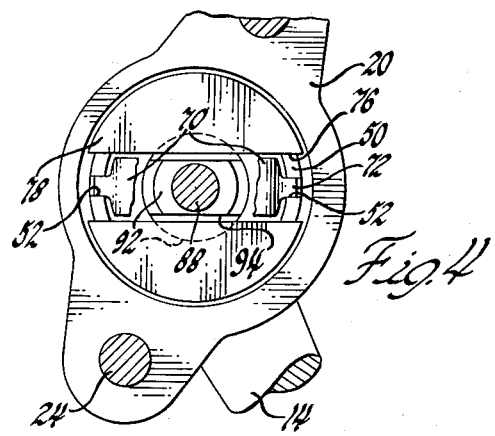
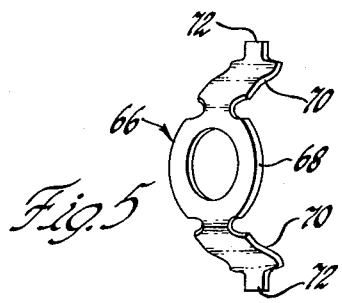
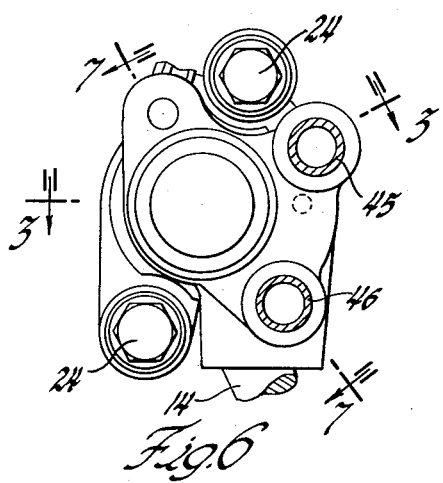
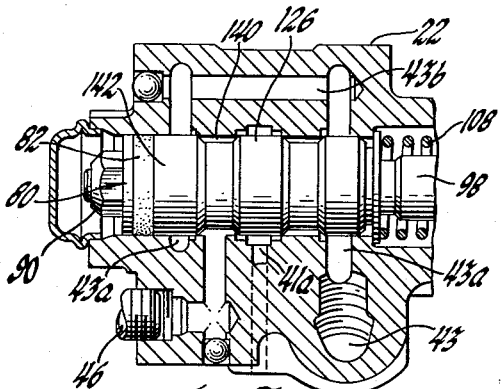
INVENTORS
Robert R. Rohde
William B. Thompson
BY
Bryce Beecher
ATTORNEY

United States Patent Office 2,996,048
Patented Aug. 15, 1961

2,996,048
ADJUSTABLE VALVE
Robert P. Rohde, Saginaw, Mich., and William B. Thompson, Newton Center, Mass., assignors to General Motors Corporation, Detroit, Mich., a corporation of Delaware
Filed Sept. 8, 1959, Ser. No. 838,698
5 Claims. (Cl. 121—46.5)

This invention relates to control means for a servomotor and in its most specific aspect concerns an improved control valve for a fluid-operated power steering gear adapted for automotive use.

Valves of the type here involved are manually movable in two directions to energize a fluid motor operably connected to a steering member and are usually so designed that in their centered or neutral position, corresponding to the straight-ahead position of the dirigible wheels, they permit fluid flow between the sump and pressure source, against the static pressure of the fluid contained in the motor. Normally, the pressure source is a pump powered through the crankshaft of the vehicle engine.

It is manifestly desirable in the operation of such a system that the extent of displacement of the control valve from center on angular movement of the steering wheel a given number of degrees be the same whether the wheel is turned to the right or to the left. Otherwise, more turning of the steering wheel is required to steer in one direction than the other.

Because of manufacturing tolerance stack-ups, it is a rare production valve that meets the desideratum just indicated. Recognition of this has led to the valve parts being deliberately fabricated with introduction of lash so that the initial movement of the valve shows up as a long, flat line at the bottom of a performance curve in which the degrees movement of the valve are plotted as abscissae and the resulting progressively increasing pressures in the fluid motor as ordinates. While this expedient to some extent overcomes the fault, in that the condition is avoided where on initial turning of the steering wheel the valve instantly responds in one direction of the turning and lags in the other direction, the over-all operating characteristics of the gear are hardly acceptable since outside the area of the flat line on the performance curve the undesired variation still exists.

The present invention has as its principal object to provide a solution to the problem just presented.

A corollary object is to provide the solution in a simple manner without injecting any substantial additional cost into the manufacture of the valve.

Further objects and features of the invention will be apparent from the following description of a preferred embodiment illustrated by the accompanying drawings wherein:

FIGURE 1 is a plan view showing a steering system of a type to which the invention is applicable, certain parts being shown broken away, others in section or diagrammatically;

FIGURE 2 is a view on the line 2—2 in FIGURE 1 with certain parts again being shown broken away;

FIGURE 3 is taken on the line 3—3 in FIGURE 6;

FIGURE 4 is a section on the line 4—4 in FIGURE 3;

FIGURE 5 is a detail of a part shown in FIGURE 3;

FIGURE 6 is taken on the line 6—6 in FIGURE 3;

FIGURE 7 is taken on the line 7—7 in FIGURE 6; and

Figure 8:
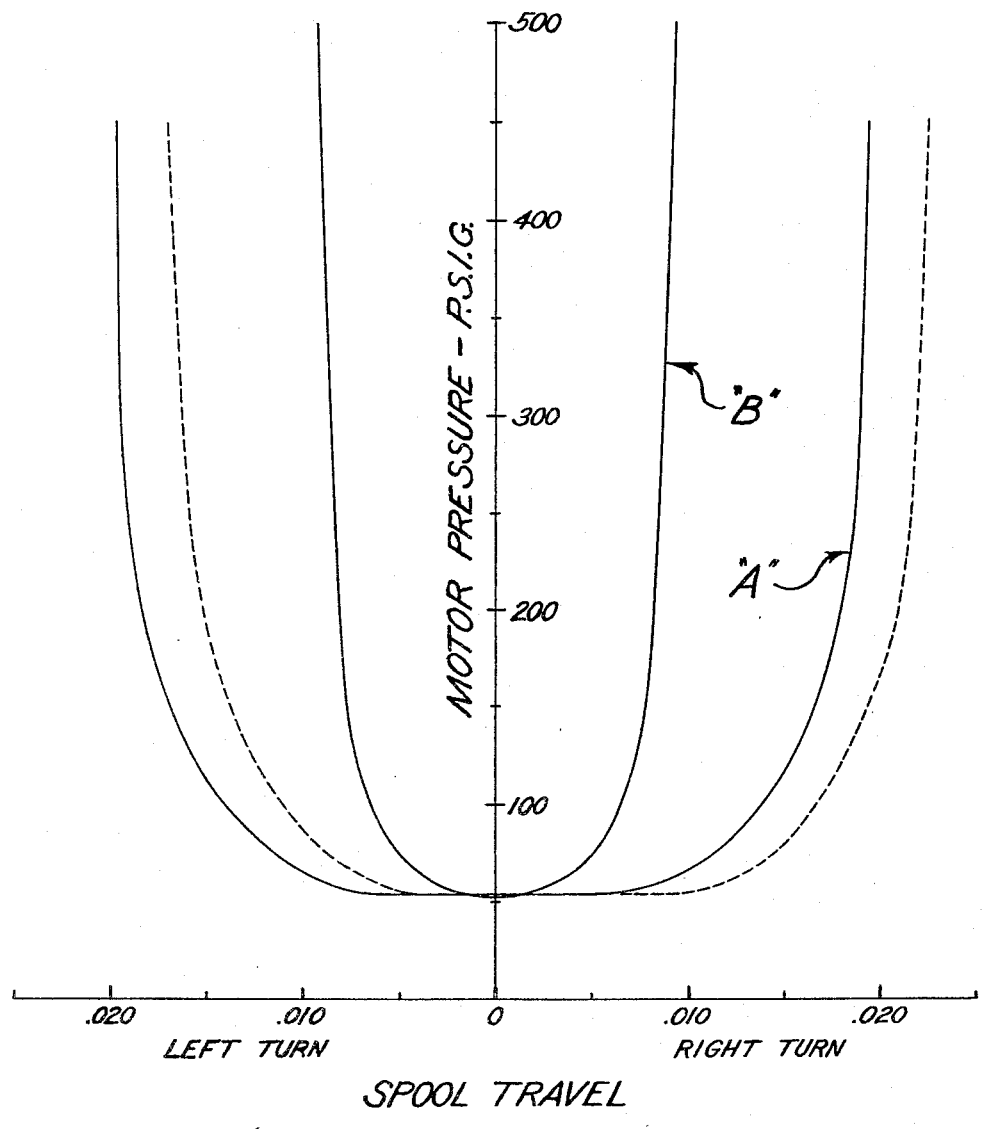
FIGURE 8 is a comparative graph reflecting the magnitude of the improvement provided by the invention.

Referring first to FIGURES 1 and 2, the linkage assembly shown is of a familiar type incorporating a relay rod 10 to which tie rods 12 are pivotally connected. It will be understood that the rods 12 actuate steering arms, not shown, extending to the dirigible wheels of the vehicle.

Relay rod 10 is supported by a pitman arm 14, manually actuated through reduction gearing, not illustrated, and by an idler arm 16 pivotally connected at its end not shown to the vehicle frame.

Fitted at the left end of the relay rod 10 is an adapter housing 20 to which a valve housing 22 is fixedly connected, such connection being effected by means of bolts 24 extending through the flanged portions of the two housings (FIGURES 2 and 6).

A fluid motor 26 reacts against a frame member 28 through the shaft 30 of the piston 32 and pivotally connects with the relay rod 10. This connection involves a ball stud carried by a sleeve 34 fastened to the relay rod.

The motor or jack 26 is supplied with pressure fluid through a control valve 38 which has connection with a pump 40 and a reservoir 42 via pressure and return lines 41 and 43, respectively. Conduits 45 and 46 provide the connection between the control valve 38 and the motor 26.

Confined within the adapter housing 20 (FIGURE 3) is a sleeve member 50 in turn confining seat elements 54 for the ball stud 56 integral with pitman arm 14. A flat coil spring 58 loading the ball seat elements 54 in the direction toward the shoulder 60 of the sleeve 50 reacts against a plug 62 which is threaded into the sleeve and held against loosening by a key element 66, shown in detail in FIGURE 5. Such element is comprised of a body portion 68 having extensions providing lateral tangs 70 and end tangs 72. Tangs 72 are accommodated in slots 52 in sleeve 50, while tangs 70 are received in a slot 76 (FIGURE 4) formed in the flanged portion 78 of the threaded plug 62. In this way, the plug is prevented from turning relative to the sleeve 50 which itself is held against rotation by the shank of the ball stud 56.

Carried within the housing 22 is a spool member 80 having at its left end an annular recess for the accommodation of a seal 82. Such spool has a central bore 84 and an end recess 86. A reach rod 88 extending through the bore and recess is threaded at its left end for the reception of a nut 90. At its opposite end, the reach rod terminates in an enlarged portion 92 which, as illustrated by FIGURE 4, is flatted at 94 for abutment with the inner face of the slotted flange 78.

A plunger 98 encircling the reach rod 88 comprises an enlarged portion carrying a seal 100, such portion of the plunger being accommodated in the enlarged portion 86a of the recess 86. A coil spring 104 bottoming in the recess 86 loads the plunger 98, tending to force the same against a washer 106 interposed between the plunger and the key 66. The latter, like the plunger 98, encircles the reach rod 88.

A coil spring 108 surrounding the plunger 98 outward of the recess 86 bears at one end against a washer 110 and at the other end against a composite seal 112 which is backed by a partition member 114 concentric with the washer 106. It is important to note that the washer 106 is of a diameter such that it provides a shoulder for the composite seal 112.

Control valve 38 is of the "open-center" type previously mentioned herein, which is to say that with the spool 80 centered in the housing 22, pressure fluid supplied by the pump 40 circulates through the valve and back to the reservoir 42 against the static pressure in conduits 45 and 46 extending to the motor 26. The pressure fluid from the pump enters an annular pressure channel 41a in the housing 22 (FIGURE 7) and flows axially in either direction to enter annular channels 43a which communicate with return line 43. An axially disposed cross passage 43b will be seen connecting the left hand channel 43a and the right hand channel 43a.

As shown in FIGURE 3, the annular pressure channel 41a has connection via an axial passage 116 and a generally radially disposed passage 118 with a chamber 120 in which the previously mentioned spring 108 is housed. The purpose of maintaining the chamber 120 filled with fluid at system pressure is to supplement the centering action of the spring 108 in a manner providing a steering "feel" at the steering wheel proportionate to the actual steering resistance. This is an expedient well known in the art and forms no part of the present invention.

In the operation of the illustrated assembly, assuming a right turn, pitman arm 14 swings leftwardly so that a pressure unbalance is created in the motor 26 in favor of the chamber 124, resulting in an assist being given the leftward movement of the relay rod 10. With the valve spool 80 displaced as indicated, i.e., to the left, fluid flow to the chamber 124 is past the central land 126 into the space 128 between such land and the end land 130, thence to the conduit 45 via connecting passages 132 and 134. Simultaneously, fluid is exhausted from the chamber 136 (FIGURE 2) via the route of conduit 46, the annular space 140 between the central land 126 and the end land 142, axial cross passage 43b and annular channel 43a which, as previously described, connects with return line 43 extending to the reservoir 42.

It will be understood that on a left turn the spool 80 becomes oppositely displaced causing reverse flow in the conduits to the motor 26. Thus, the pressure differential across the piston 32 is in favor of the chamber 136, the assist to the relay rod 10 consequently being applied in the rightward direction.

Mention should be made of the fact that the axial movement of the spool 80 is limited by the abutments *x* and *y* located in the path of the flange portion 78 of plug 62.

Now for the reasons indicated in the forepart hereof, it has been extremely difficult to fabricate the parts of the illustrated gear so that with spool 80 in its position corresponding to the straight-ahead position of the dirigible wheels, the fluid pressures in the two lines to the motor 26 are exactly equal.

In accordance with the invention, exact centering of the spool 80 within its housing 22 is accomplished by means of the plunger 98, spring 104 and the reach rod 88. Thus, at assembly or, subsequently, should it be required, gauges are affixed to the fixtures 148 and 150 (FIGURE 2) whereafter nut 90 (FIGURE 3) is backed off to allow spring 104 to force the spool 80 leftwardly an amount assuring disposition of the spool left of center. Nut 90 is then tightened on the rod 88 to axially displace the spool rightwardly until the pressures shown on the gauges are exactly equal. The rightward displacement of the spool 80 is, of course, accompanied by compression of the spring 104, since plunger 98 is precluded from rightward movement by virtue of its abutting engagement with the washer 106.

The spool now being exactly centered, the gauges are removed and the connections made with the conduits or hoses 45 and 46. In subsequent operation, the spring 104 acts as a solid link in a system, the same being manufactured to the required stiffness.

It is to be observed that the gap 152 avoids the possibility of compression of the spring 108 incident to the described centering procedure. Also, it should be noted that the washer or spring seat 110, which is U-shaped for assembly purposes, shoulders against the plunger 98 to the end that on rightward movement of the spool 80 the washer is carried along with the spool and plunger to compress the centering spring 108. On leftward movement of the spool 80, the composite seal 112 partakes of such movement by reason of its shouldering engagement with the washer 106 between the outer end of plunger 98 and the key 66.

The improvement wrought by the invention is best illustrated by the graph of FIGURE 8 wherein the solid line curves A and B represent power steering gears conforming to the invention, the dotted line curve a gear as illustrated herein but without the spring 104 and the associated parts enabling the exact centering of the valve spool. It should be noted that whereas the dotted line curve shows substantial variation in the degree of displacement of the valve spool as between left turn and right turn at any selected motor pressure, curve A shows substantial equality.

In lieu of applying the invention in the manner reflected by curve A, the same may be applied to achieve the results shown by curve B. Here, the flat line at the bottom has been done away with, of course, means that the valve is instantly responsive in both directions, an improvement possible as a result of the balancing operation.

We claim:

1. A control device for a servo-motor, said device being of the type comprising a manually actuable element having a predetermined position between two extremes toward which it is movable, the movement of said element toward either of said extremes being marked by a progressively increasing force output of said motor, said element having centering means associated therewith and further having associated therewith spring means reacted by the manual means and enabling variation in the said predetermined position of said element, said spring means in the normal operation of said element acting as a solid link in the system including said element.

2. A control device for a servo-motor, said device being of the type comprising a manually actuable element having a predetermined position between two extremes toward which it is axially movable, the movement of said element toward either of said extremes being marked by a progressively increasing force output of said motor, said element having spring-centering means associated therewith and further having associated therewith spring means reacted by the manual means and enabling variation in the said predetermined position of said element, said last spring means in the normal operation of said element acting against the resistance of said first spring means as a solid link in the system including said element.

3. A control valve for a fluid servo-motor, said valve comprising a manually actuable spool element having a predetermined position between two extremes toward which it is axially movable, the movement of said element toward either of said extremes being marked by a progressively increasing force output of said motor, said element having spring-centering means associated therewith and further having associated therewith spring means reacted by the manual means and enabling variation in the said predetermined position of said element, said last spring means in the normal operation of said element acting against the resistance of said first spring means as a solid link in the system including said element.

4. A fluid-operated servo comprising a valve housing member provided with a pressure channel, an exhaust channel and a pair of passages communicating with the servo-motor, a spool element within said housing having a predetermined position between two extremes toward which it is axially movable, said spool element being provided with lands complementary to said channels, means for manually actuating said spool element, means providing a chamber at one end of said spool element adapted for the reception of pressure fluid serving as a resistance to axial displacement of said spool element, a plunger member between said spool element and manually actuated means, spring means mediate said plunger member and said spool element, and means for axially moving said spool element in the direction of said plunger member to change the said predetermined position of said spool element, such movement operating to load said spring means which in the normal operation of said spool element acts against the resistance of said pressure fluid as a solid link in the system including said element.

5. A fluid-operated servo comprising a valve housing member provided with a pressure channel, an exhaust channel and a pair of passages communicating with the servo-motor, an axially movable spool element within said housing having a recess in one end thereof and further having a central bore opening to said recess, said spool element being provided with lands complementary to said channels, means for manually actuating said spool element, means providing a chamber at one end of said spool element adapted for the reception of pressure fluid serving as a resistance to axial displacement of said spool element, a centering spring in said chamber, a plunger member accommodated in part in said recess and abutting at its opposite end a component of said manually actuated means, a coil spring bottoming in said recess and abutting the end of the plunger within the recess, and a reach rod extending through said bore and said recess for connection to said manually actuated means, said reach rod carrying an element at its end opposite said last connection whereby said spool element may be adjusted axially with compression of said last spring means to a predetermined position between two extremes marking the limits of its axial movement in the operation of the servo, said coil spring means in the normal operation of said spool element acting against the resistance of said pressure fluid and said centering spring as a solid link in the system including said spool element.

References Cited in the file of this patent
UNITED STATES PATENTS 2,679,235    Van Meter _____ May 25, 1954